United States Patent [19]

Chang

[11] Patent Number: 4,943,997
[45] Date of Patent: Jul. 24, 1990

[54] DEVICE FOR COMMUNICATING A DOORSIDE INTERCOM SET WITH A REMOTE TELEPHONE

[76] Inventor: Mei-Yin Chang, 9 Fl., No. 303, Fu Hsing N. Rd., Taipei, Taiwan

[21] Appl. No.: 338,215

[22] Filed: Apr. 14, 1989

[51] Int. Cl.⁵ .................. H04M 1/26; H04M 11/02
[52] U.S. Cl. ............................... 379/160; 379/355; 379/103
[58] Field of Search ............. 379/159, 160, 355, 103

[56] References Cited
U.S. PATENT DOCUMENTS
4,764,953  8/1988  Chern .......................... 379/355

Primary Examiner—Stafford D. Schreyer
Attorney, Agent, or Firm—Bacon & Thomas

[57] ABSTRACT

A device is disclosed for communicating a doorside intercom set of an intercom system with a selected forwarding telephone, having a microprocessor and an input for inputting the telephone number of the selected remote telephone. To detect the state of the selected remote telephone, a back-ring/busy tone detector is provided. To enable a host to remotely change the number of the selected remote telephone, a multiple frequency signal decoder and a ring detector is provided.

4 Claims, 1 Drawing Sheet

DEVICE FOR COMMUNICATING A DOORSIDE INTERCOM SET WITH A REMOTE TELEPHONE

The present invention relates to a device which serves to interconnect the doorside intercom set of a house with a selectable remote telephone which is far away from the house.

The conventional intercom system for a house comprises a doorside intercom set and an indoor intercom set. With the intercom system, a visitor at the door can use the doorside intercom set to exchange with the host using the indoor intercom set. When the visitor presses the push button of the doorside intercom set, the indoor intercom set will ring. Sometimes, the host may be relatively far away from the indoor intercom set and has to walk a relatively long distance to get access to the indoor intercom set. Therefore an interconnecting device was developed. The interconnecting device connects the doorside intercom set with an indoor (local) telephone (and also all the extensions of the telephone) of the same house. This device is disposed between the doorside intercom set and the indoor intercom set, and is also connected to the cable of the indoor telephone. When a visitor pushes the button of the doorside intercom, this telephone (and also all the extensions of this local telephone) as well as the indoor intercom set will ring. This function enables the host to use any of the extension which is nearest to him to identify the visitor and the visitor's intention, without going to the indoor intercom set which may be a distance from him.

However this device can only communicate the doorside intercom set with the indoor telephone and its extensions, but not with any other selected telephone. If there is nobody in the house, the visitor will receive no answer from indoors. Thus a burglar may pretend to be a visitor to use the intercom to probe the vacancy of the house and take advantage of the opportunity of the absence of occupants.

In order to prevent an unauthorized visitor to probe the vacancy from the doorside intercom set, it is necessary to have a device which can communicate the doorside intercom set with a selected telephone which is immediately accessible by the host when he is far away from his house.

This function cannot be achieved by the aforesaid conventional device since it is designed to exclusively connect the doorside intercom set with the indoor telephone and the extensions, but it is unable to communicate the doorside intercom with a selectable remote telephone. In order to achieve this function, a microprocessor and an input means to input the phone number of the selected remote telephone, as well as a dialing means must be provided, thus when the visitor pushes the button of the doorside intercom, the microprocessor will instruct the dialing means to dial the number of the selected telephone. If the selected telephone is not busy, the intercommunication between the doorside intercom set and the selected telephone (which is accesible by the host) is built.

If the selected telephone is busy at this moment, the intercommunication cannot be built. There is no practical way to prevent the burglar from knowing the vacancy of the house. However, it is noteworthy that such a device is not exclusively directed to preventing a burglar to probe the vacancy of a house. In fact, more importantly, this invention provides a communication between the host who is not at home and the friendly (unhostile) visitors who would otherwise miss the host. If the selected telephone is busy, the microprocessor may immediately stop the call (case A), or alternately (case B) try to call within a predetermined period (for example, 30 seconds), depending on the software (controlling program) in the microprocessor. In the latter's case, if in this period, the selected telephone changes from busy to on-hook state, the microprocessor will connect the doorside intercom set with the selected telephone. If the selected telephone remains busy when the predetermine time is over, the microprocessor will stop the call. A manually operated selector switch with two modes must be provided to selectively connect the doorside intercom set with the indoor intercom set (and also the indoor telephone and all the indoor extensions) or to connect the doorside intercom with the device. Normally, when there is somebody in the house, the selector switch is kept in a first position in which the doorside intercom set is communicated with the indoor intercom set. Thus the intercom system works in the same way as the conventional intercom system. When the host leaves, he must shift the selector switch to a second position in which the doorside intercom set is communicated with this device.

This invention will be better understood when read in connection with the accompanying drawing in which:

DETAILED DESCRIPTION OF PREFERRED EMBODIMENT

Figure 1:
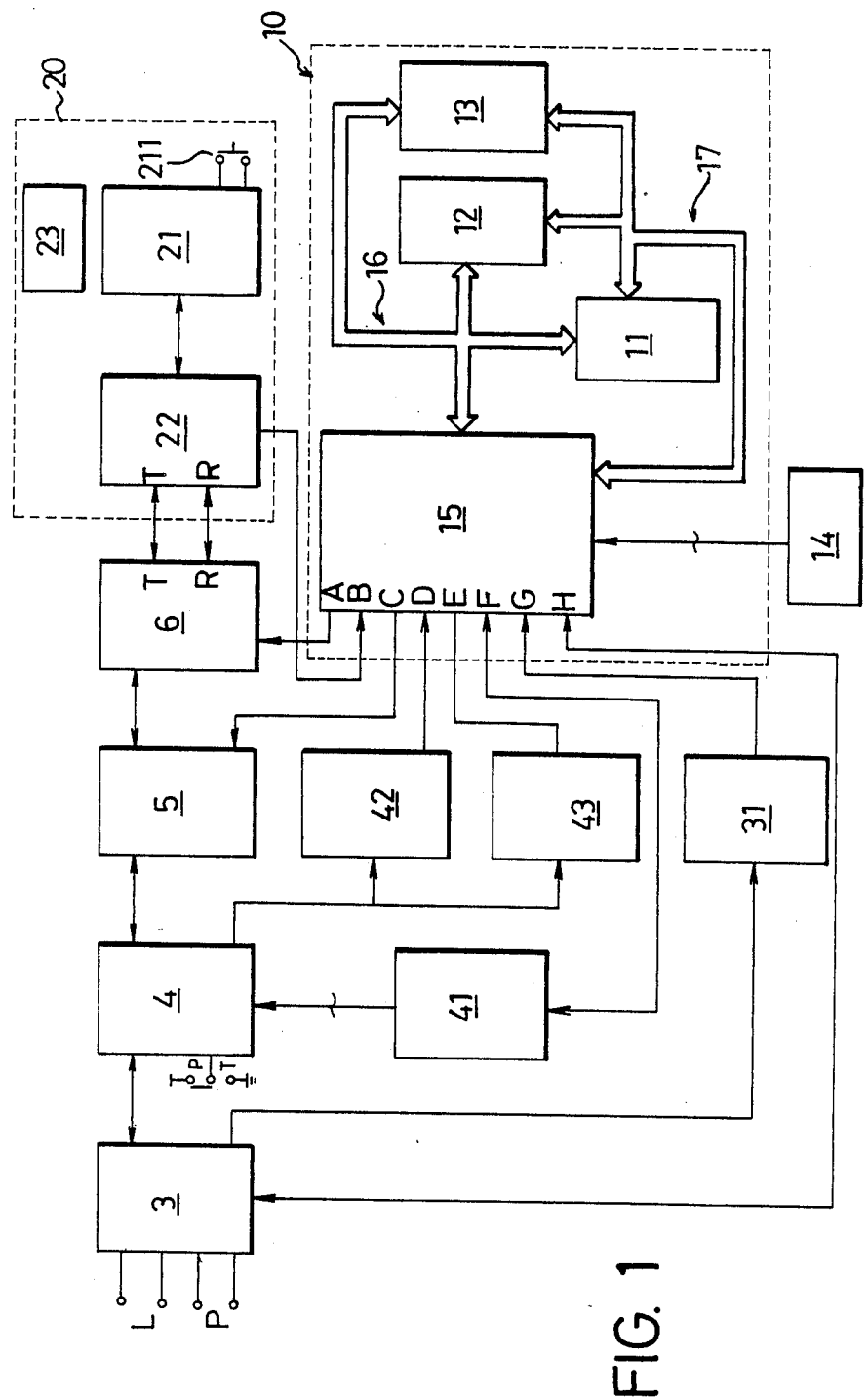
FIG. 1 is a block diagram showing the connection of this invention with a doorside intercom.

Since the aforesaid selector switch is well known means, and the indoor intercom set is not involved in this invention, they are omitted in the drawing for simplicity reason. Hence, in FIG. 1 the doorside intercom set (20) is shown to be directly connected to the device of this invention. As stated before, this invention comprises a microprocessor (10) for storing the phone number of the selected telephone (not shown) and an input means (14) (practically a keyboard) for inputting the phone number.

The doorside intercom set (20) makes no difference from the conventional doorside intercom set. It comprises an outdoor circuit (21) with a pushing button (211), an indoor circuit (22) and a power supply (23).

The microprocessor comprises a CPU (11), a ROM (12) for storing the controlling program, a RAM (13) for storing the phone number of the selected telephone, and an interface (15) for converting the signals from the keyboard (14) and from the outside into signals readable by the CPU (11). Data bus (16) and address bus (17) interconnect CPU (11), ROM (12), RAM (13) and interface (14). The phone number of the selected telephone is inputted via the keyboard (14) and stored in the RAM (13).

Since in normal communication between telephones, when one dials the number of a remote telephone B from a local telephone A, a dialing signal is produced by the telephone A and is tranmitted via the cable to the Central Office. The the Central Office will detect the state of the remote telephone B (ON-HOOK or BUSY), and gives the calling side (telephoner A) a back-ring tone (in ON-HOOK state) or a busy tone (in BUSY state). Thus the calling side must have a back-ring tone/busy tone detector to discriminate the two states.

Likewise, if one wishes the communicating device of this invention to build the interconnection between the doorside intercom set (20) and the selected remote telephone, one must send out a dialing signal to the selected remote telephone, and the state of the latter must be detected. Therefore a dial interface (4) and a dial buffer (41), as well as a back-ring-busy tone detector (43) must be provided to simulate the condition in real telephone communication. When the visitor pushes the button (211), the produced pulse will be transmitted through the indoor circuit (22) and the bell-in pin B of the interface (15) to the CPU. The CPU will read the selected phone number stored in the RAM (13) and send out a phone-number signal. This phone-number signal, after passing through the interface (15), the dial buffer (41) and the dial interface (4), is converted into a dialing signal similar to a real dialing out by the dialing of a telephone set and is transmitted via a central office control circuit (3) to the selected telephone. Also a signal of high level is sent via the H pin (hook control) of the interface (15) to the central office control circuit (3) to off-hook the cable path of the blocks (3), (4), (5), (6) to the doorside intercom set (20). The central office will detect the state of the selected telephone and give a back-ring or busy tone depending on the latter's state. Thus back-ring/busy-tone detector (43) can perceive the state of the selected telephone. If busy-tone signal is detected, the CPU (11) will end the call until the next push on on button of the doorside intercom set (case A), or alternately, try a predetermined number of times again within a predetermined period (case B) before stopping this call.

If back-tone signal is detected, the selected telephone is not busy. If the hand piece of the remote telephone is taken up within 30 seconds, its "off-hook" state will be perceived by the central office at the moment that the hand piece is picked up, so the selected remote telephone will be communicable with the doorside intercom set (20) via the blocks (3), (4), (5), (6). If the hook of the selected telephone is not taken up over 30 seconds, its "off-hook state" cannot be timely pereceived, and the central office will automatically end this call. This function is well known in telephone communication. Thus its details are not necessary.

The object of this invention is to enable the host to "remotely" change the number of the selected telephone by means of a telephone call from any available remote telephone to his own house. In this procedure, the host must dial his own phone number from any remote telephone and firstly input a "password" to actuate the "number-changing function", then input the desired new phone number of another selected telephone. In this case, a multiple-frequency decoding circuit (42) and a ring detector (31) are required. Since these are well-known technique in telephone line remote control, their details are not necessary.

I claim:

1. A device for communicating a doorside intercom set having a push button of an intercom system with a selected remote telephone via a cable, comprising a microprocessor with a software and memory means, an input means for inputting the phone number of said selected remote telephone into said memory means, and detecting means to detect the state of said selected remote telephone;

said software being so programmed that when said push button is pushed, said microprocessor will read the phone number from said memory means and send out a corresponding signal via said cable to give a call to said selected remote telephone to build up the communication between said doorside intercom set and said selected remote telephone when said selected remote telephone is detected by said detecting means as not busy, said device further comprising a number changing means for changing the number of said selected remote telephone stored in said memory means, said number changing means being only actuated to receive a new telephone number inputted by dialing from any remote telephone via said cable to said device after a specific password code is inputted by dialing said any remote telephone via said cable to said device.

2. The device according to claim 1 wherein said microprocessor will stop said call when said selected remote telephone is detected as busy.

3. The device according to claim 2, wherein said microprocessor stops said call immediately when said selected remote telephone is detected as busy.

4. The device according to claim 2, wherein said microprocessor stops said call after a predetermined number of times when said selected remote telephone is detected as busy.

* * * * *